(12) United States Patent
Xu et al.

(10) Patent No.: US 11,740,618 B2
(45) Date of Patent: Aug. 29, 2023

(54) SYSTEMS AND METHODS FOR GLOBAL CYBER-ATTACK OR FAULT DETECTION MODEL

(71) Applicant: GENERAL ELECTRIC COMPANY, Schenectady, NY (US)

(72) Inventors: Rui Xu, Rexford, NY (US); Weizhong Yan, Clifton Park, NY (US); Masoud Abbaszadeh, Clifton Park, NY (US); Matthew Christian Nielsen, Scotia, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 252 days.

(21) Appl. No.: 17/239,054

(22) Filed: Apr. 23, 2021

(65) Prior Publication Data
US 2022/0357729 A1   Nov. 10, 2022

(51) Int. Cl.
G05B 23/02   (2006.01)
G06N 3/08   (2023.01)
G06N 3/045   (2023.01)

(52) U.S. Cl.
CPC ......... *G05B 23/024* (2013.01); *G05B 23/027* (2013.01); *G05B 23/0221* (2013.01); *G06N 3/045* (2023.01); *G06N 3/08* (2013.01)

(58) Field of Classification Search
CPC .......... G05B 23/024; G05B 23/0221; G05B 23/027; G06N 3/045; G06N 3/08
See application file for complete search history.

(56) References Cited

U.S. PATENT DOCUMENTS 10,397,258 B2   8/2019 Luo et al.
2019/0230119 A1*   7/2019 Mestha ............... H04L 63/1416
(Continued)

FOREIGN PATENT DOCUMENTS

KR   10212021   6/2020
WO   2020013958 A1   1/2020

OTHER PUBLICATIONS

Lu, Xiao et al, "Detecting Cyberattacks in Industrial Control Systems Using Online Learning", Neurocomputing, July DOI: 10.10:16/jneucom.2019.07.031, 35 pages.
(Continued)

*Primary Examiner* — Manuel A Rivera Vargas
(74) *Attorney, Agent, or Firm* — Buckley, Maschoff & Talwalkar LLC

(57) ABSTRACT

An industrial asset may have monitoring nodes that generate current monitoring node values representing a current operation of the industrial asset. An abnormality detection computer may detect when a monitoring node is currently being attacked or experiencing a fault based on a current feature vector, calculated in accordance with current monitoring node values, and a detection model that includes a decision boundary. A model updater (e.g., a continuous learning model updater) may determine an update time-frame (e.g., short-term, mid-term, long-term, etc.) associated with the system based on trigger occurrence detection (e.g., associated with a time-based trigger, a performance-based trigger, an event-based trigger, etc.). The model updater may then update the detection model in accordance with the determined update time-frame (and, in some embodiments, continuous learning).

20 Claims, 23 Drawing Sheets

(56) References Cited

U.S. PATENT DOCUMENTS

2019/0394215 A1   12/2019   Lee et al.
2020/0389478 A1   12/2020   Abbaszadeh et al.

OTHER PUBLICATIONS

Yan, Weizhong et al. "Attack Detection for Securing Cyber Physical Systems", IEEE Internet of Things Journal—Jun. 2019, DOI: 10.1109/JIOT.2019.29, 15 pages.

* cited by examiner

| INDUSTRIAL ASSET IDENTIFIER 2202 | INDUSTRIAL ASSET DESCRIPTION 2204 | DETECTION MODEL IDENTIFIER 2206 | TRIGGER OCCURRENCE 2208 | DATE (TIME) 2210 | TIME-FRAME 2212 | STATUS 2214 |
|---|---|---|---|---|---|---|
| IA_2001 | GAS TURBINE | DM_01 | TIME | 8/10/2025 (08:15) | SHORT-TERM | OK |
| IA_2001 | GAS TURBINE | DM_01 | PERFORMANCE | 8/15/2025 (08:18) | SHORT-TERM | UPDATED |
| IA_2001 | GAS TURBINE | DM_01 | EVENT | 10/15/2025 (13:55) | MID-TERM | IN PROCESS |
| IA_2002 | ELECTRIC POWER GRID | DM_02 | TIME | 12/1/2027 (12:00) | LONG-TERM | UPDATED |

*FIG. 22*

SYSTEMS AND METHODS FOR GLOBAL CYBER-ATTACK OR FAULT DETECTION MODEL

This invention was made with Government support under contract number DE-OE0000903 awarded by the Department of Energy. The Government has certain rights in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). Existing approaches to protect an industrial control system, such as failure and diagnostics technologies, may not adequately address these problems—especially when multiple, simultaneous attacks occur since such multiple faults/failure diagnostic technologies are not designed for detecting stealthy attacks in an automatic manner.

Moreover, many industrial systems, such as natural gas compression stations in oil and gas industry, are inherently dynamic systems, due to the factors of physics driven degradation, various maintenance actions, different operation and control settings, etc. The performance of any fault or cyber-attack detection model built with initial training data will inevitably deteriorate, even at a significant level, if the model does not continuously learn from its ever-changing environment. For the application of cyber-physical system abnormality detection, the lack of abnormal data can make it difficult to continuously update the detection model in a timely manner. Some technologies developed under the umbrella of concept "drift learning" or "domain adaptation" were directly developed to address these types of challenges in industries such as power, oil and gas, etc.

SUMMARY

According to some embodiments, an industrial asset may be associated with a plurality of monitoring nodes, each monitoring node generating a series of monitoring node values over time that represent operation of the industrial asset. An abnormality detection computer may detect when a monitoring node is currently being attacked or experiencing a fault based on a current feature vector, calculated in accordance with current monitoring node values, and a detection model that includes a decision boundary. A model updater may determine an update time-frame (e.g., short-term, mid-term, long-term, etc.) associated with the system based on trigger occurrence detection (e.g., associated with a time-based trigger, a performance-based trigger, an event-based trigger, etc.). The model updater may then update the detection model in accordance with the determined update time-frame (and, in some embodiments, continuous learning).

Some embodiments comprise: means for detecting, by an abnormality detection computer, whether a monitoring node is currently being attacked or experiencing a fault based on a current feature vector, calculated in accordance with current monitoring node values, and a detection model that includes a decision boundary; means for determining, by a computer processor of a model updater, an update time-frame associated with the system based on trigger occurrence detection; and means for update the detection model in accordance with the determined update time-frame (and, in some embodiments, continuous learning).

Some technical advantages of some embodiments disclosed herein are improved systems and methods to protect an industrial asset from cyber-attacks and identify faults in an automatic and accurate manner.

BRIEF DESCRIPTION OF THE DRAWINGS

FIG. 22 is a tabular portion of a detection model database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Industrial control systems that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats in an automatic and accurate manner.

Generally, embodiments described herein may be associated with systems and methods to detecting a global cyber-physical system attack or fault with a continuous learning capability. Specifically, the systems and methods may comprise multiple time-frame solutions (e.g., based on short-term, mid-term, or long-term requirements of the industrial systems) to continuously adapt a detection model to a nonstationary environment. Embodiments may maintain an effective performance of a detection model in a complex and dynamic environment resulting from factors such as physics-driven degradation, maintenance actions, different operation and/or control settings, etc.

Figure 1:
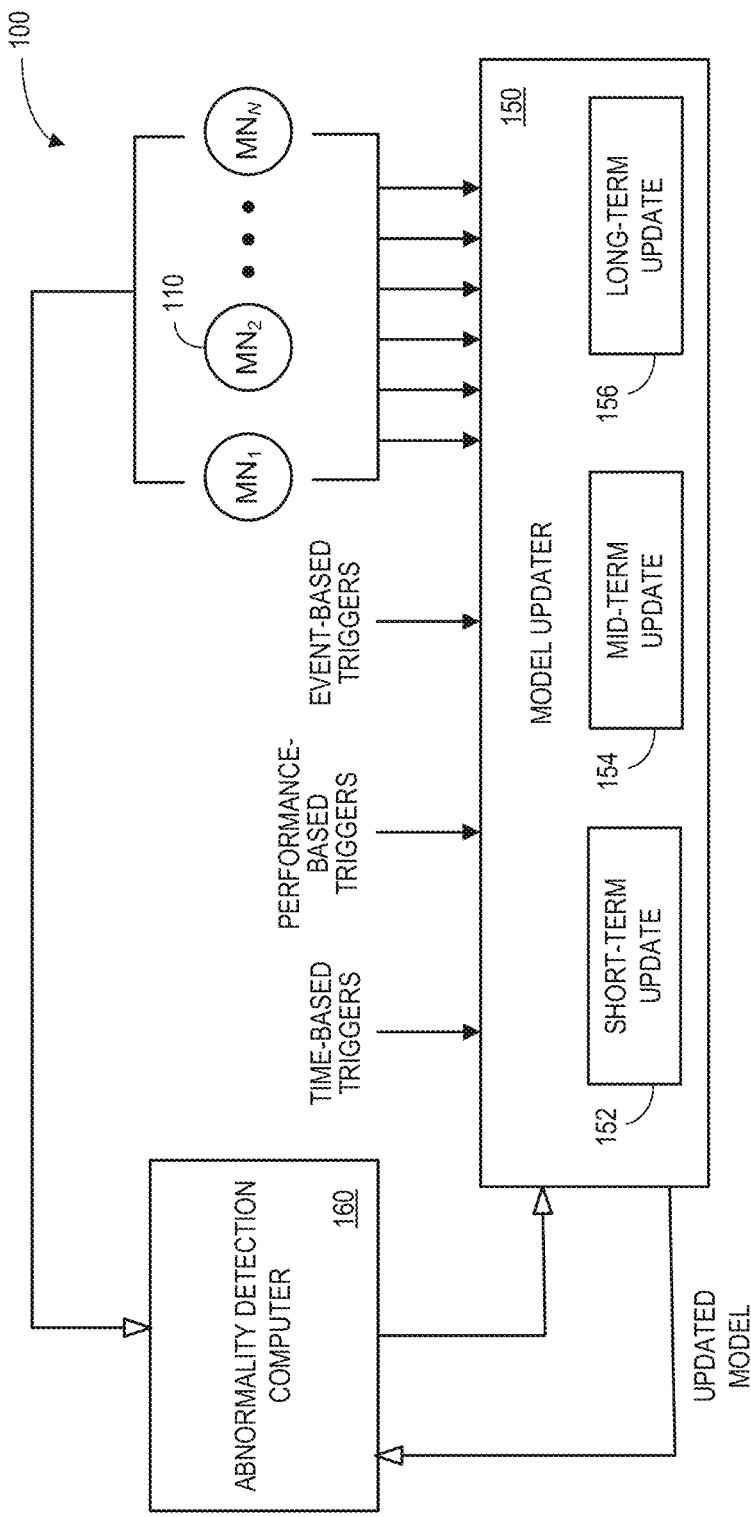
FIG. 1 is a high-level block diagram of a system to protect an industrial asset according to some embodiments.

FIG. 1 is a high-level architecture of a system 100 that might be used to protect an industrial asset such as a gas turbine. The system 100 may include a plurality of monitoring nodes 110, each monitoring node generating a series of current monitoring node values over time that represent current operation of the industrial asset (e.g., a temperature, a speed, a voltage, etc.). An abnormality detection computer 160 coupled to the monitoring nodes 110 may be adapted to determine that a particular monitoring node is currently being attacked by a cyber-threat or is experiencing a failure (e.g., a sensor might be stuck) using a detection model in accordance with any of the embodiments described herein. A model updater 150 may receive various types of trigger information and, as a result, select an update time frame for the detection model (e.g., a short-term update 152, a mid-term update 154, a long-term update 156, etc.). The types of trigger information might include, for example, time-based triggers, performance-based triggers, event-based triggers, etc. According to some embodiments, the model updater 150 may employ continuous learning techniques.

Figure 2:
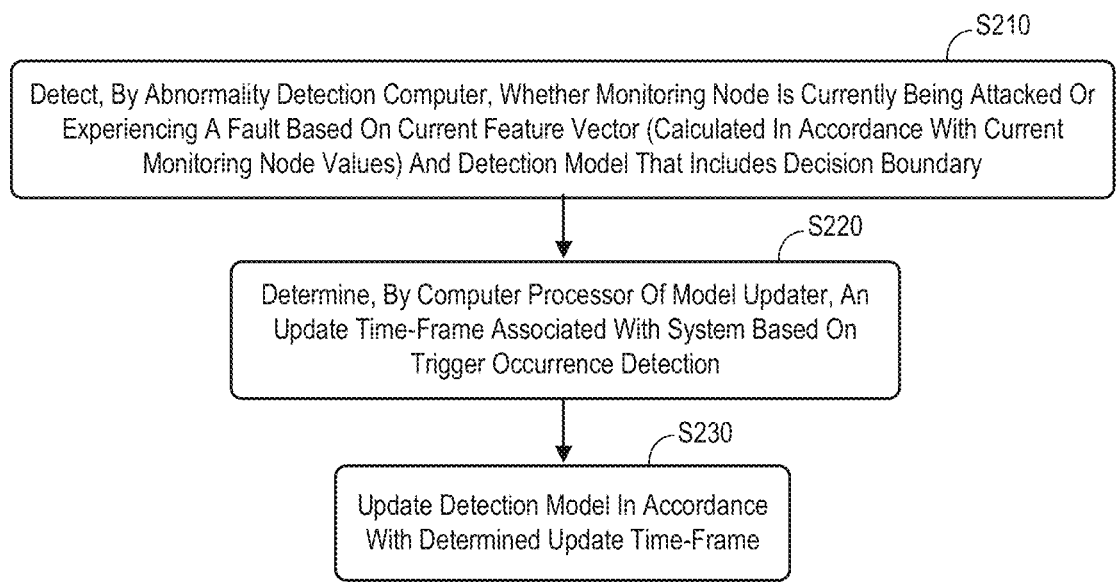
FIG. 2 is an industrial asset protection method in accordance with some embodiments.

FIG. 2 is an industrial asset protection method that might be associated with the elements of the system of FIG. 1. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an abnormality detection computer may detect whether a monitoring node is currently being attacked or experiencing a fault based on a current feature vector, calculated in accordance with current monitoring node values, and a detection model that includes a decision boundary (e.g., as described herein in connection with FIGS. 3 through 9). At S220, a computer processor of a model updater (e.g., a continuous learning model updater) may determine an update time-frame associated with the system based on trigger occurrence detection. In some embodiments, at least one trigger occurrence detection may be associated with a "time-based trigger." For example, a determination might be made after a pre-determined number of minutes, hours, days, weeks, months, years, etc. Similarly, a determination might be made after a predetermine number of vectors have been evaluated, a number of abnormalities have been detected, etc.

Other examples of trigger occurrence detections include a "performance-based trigger." For example, when a number of false positive detections or false negative detections exceed a limit, a detection model might be updated. Still other examples include an "event-based trigger," such as a performance of a maintenance procedure, a software update, unusual weather events (e.g., a series of uncharacteristically cold days), etc. Although examples of some types of triggers are provided herein, note that embodiments may be associated with any other type of trigger. Moreover, embodiments may combine various types of triggers in a single rule (e.g., using Boolean logic) to determine when a detection mode update might be appropriate. In some embodiments, there are three different types of updates: short-term, mid-term, and long-term. Note, however that embodiment might be associated with fewer types of updates (e.g., only short-term and long-term) or more types of updates (e.g., there might be five or more different potential update time-frames). In some embodiments, a mid-term model update or long-term model update might be associated with transfer learning and/or a Domain-Adversarial Neural Network ("DANN"). At S240, the detection model may be updated in accordance with the determined update time-frame (and, in some embodiments continuous learning).

Figure 3:
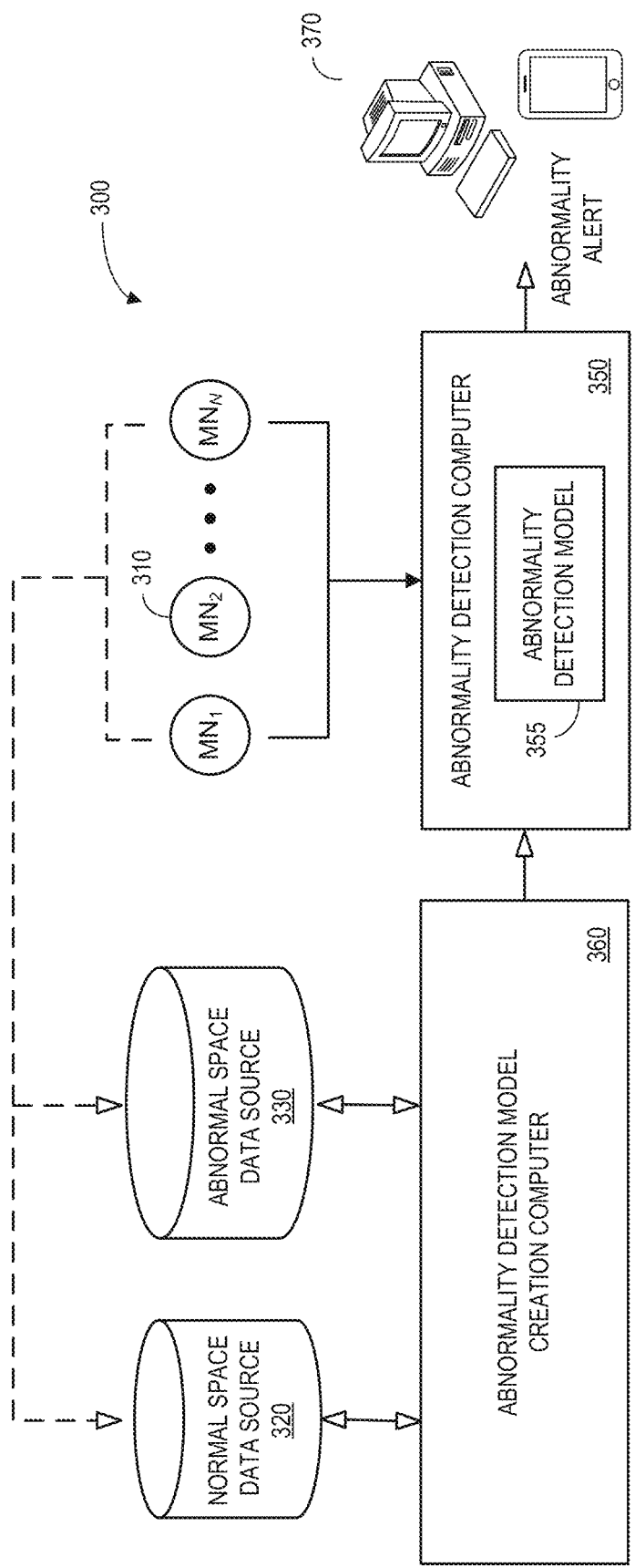
FIG. 3 is a block diagram of an industrial asset protection system according to some embodiment.

Note that a determination that a particular monitoring node is currently abnormal might be based on an abnormality detection model created for the industrial asset. For example, FIG. 3 is an example of an industrial asset protection system 300. The system 300 may include a "normal space" data source 320 storing, for each of a plurality of monitoring nodes 310, a series of normal values over time that represent normal operation of an industrial asset (e.g., collected from actual monitoring node 310 data as illustrated by the dashed line in FIG. 3). The system 300 may also include an "abnormal space" data source 330 storing series of values over time associated with monitoring nodes undergoing a cyber-attack (e.g., as recorded during an actual attack or as predicted by a high-fidelity physics-based industrial asset model) and/or experiencing a failure.

Information from the normal space data source 320 and the abnormal space data source 330 may be provided to an abnormality detection model creation computer 360 that uses this data to create a decision boundary (that is, a boundary that separates normal behavior from abnormal behavior). The decision boundary may then be used by an abnormality detection computer 350 executing an abnormality detection model 355. The abnormality detection model 355 may, for example, monitor streams of data from the monitoring nodes 310 comprising data from sensor nodes, actuator nodes, and/or any other critical monitoring nodes (e.g., monitoring nodes $MN_1$ through $MN_N$) and automatically output an abnormality alert (e.g., indicating that various monitoring nodes of the industrial asset are normal, attacked, or experiencing a fault) to one or more remote monitoring devices 370 when appropriate (e.g., for display to a user) and/or to a dynamic, resilient estimator. As used herein, the terms "automatically" or "autonomous" may refer to, for example, actions that can be performed with little or no human intervention. According to some embodiments, information about a detected abnormality may also be transmitted back to an industrial control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 360 may store information into and/or retrieve information from various data stores, such as the normal space data source 320 and the abnormal space data source 330. The various data sources may be locally stored or reside remote from the abnormality detection model creation computer 360. Although an abnormality threat detection model creation computer 360 is shown in FIG. 3, any number of such devices may be included. Moreover, various devices described herein might be combined according to embodiments of the present invention. For example, in some embodiments, the abnormality detection model creation computer 360, normal space data source 320, and abnormal space data source 330 might comprise a single apparatus. The abnormality detection model creation computer 360 and/or abnormality detection computer 350 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage attack and fault information in accordance with any of the embodiments described herein. In some cases, an interactive graphical display interface may let a user define and/or adjust certain parameters (e.g., attack or fault detection trigger levels or model configurations) and/or provide or receive automatically generated recommendations or results from the abnormality detection model creation computer 360 and/or the abnormality detection computer 350.

Figure 4:
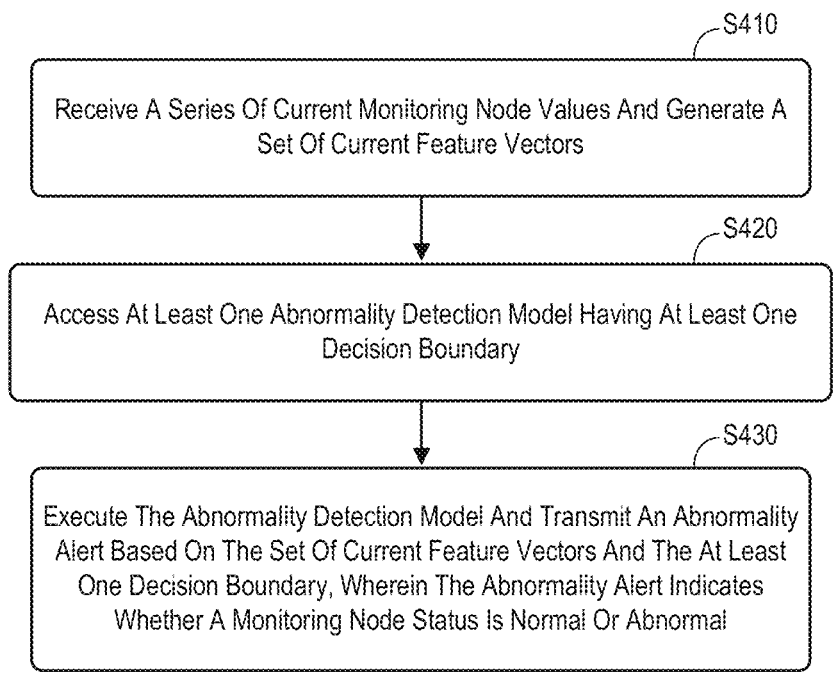
FIG. 4 illustrates a method of generating an abnormality alert in accordance with some embodiments.

The decision boundary associated with the abnormality detection model 355 can be used to detect cyber-attacks and faults. For example, FIG. 4 is an industrial asset protection method that might be implemented according to some embodiments. At S410, the system may receive, from a plurality of monitoring nodes, a series of current values over time that represent a current operation of an industrial asset. The system may also generate, based on the received series of current values, a set of current feature vectors. At S420, an abnormality detection model may be accessed including at least one decision boundary. At S430, the model may be executed and an abnormality alert may be transmitted (e.g., to a dynamic, resilient estimator) based on the set of current feature vectors and the decision boundary when appropriate (e.g., when a cyber-attack or fault is detected). According to some embodiments, one or more response actions may be performed when an abnormality alert is transmitted. For example, the system might automatically shut down all or a portion of the industrial asset (e.g., to let the detected potential cyber-attack or fault be further investigated). As other examples, one or more parameters might be automatically modified, a software application might be automatically triggered to capture data and/or isolate possible causes, a virtual sensor might be created or deployed, etc.

When available, a system may take advantage of the physics of an industrial asset by learning a priori from tuned high fidelity equipment models and/or actual "on the job" data to detect single or multiple simultaneous adversarial threats to or faults in the system. Moreover, monitoring node data may be converted to features using advanced feature-based methods, and the real-time operation of the control system may be monitoring in substantially real-time. Abnormalities may be detected by classifying the monitored data as being "normal" or "abnormal" (e.g., "attacked" or "fault"). This decision boundary may be constructed in feature space using dynamic models and may help enable early detection of vulnerabilities (and potentially avert catastrophic failures) allowing an operator to restore the control system to normal operation in a timely fashion. Note, however, that in many cases a physics-based model of an industrial asset might not be readily available.

Figure 5:
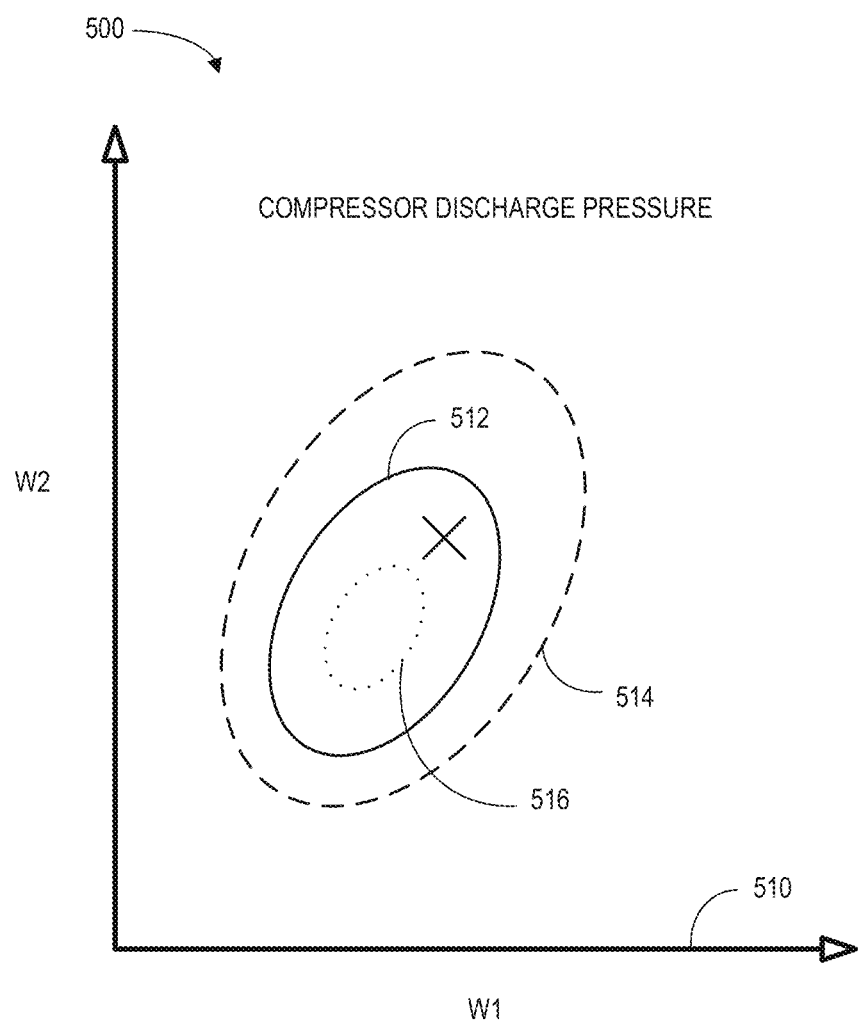
FIGS. 5 and 6 illustrate features, feature vectors, and decision boundaries in accordance with some embodiments.
Figure 6:
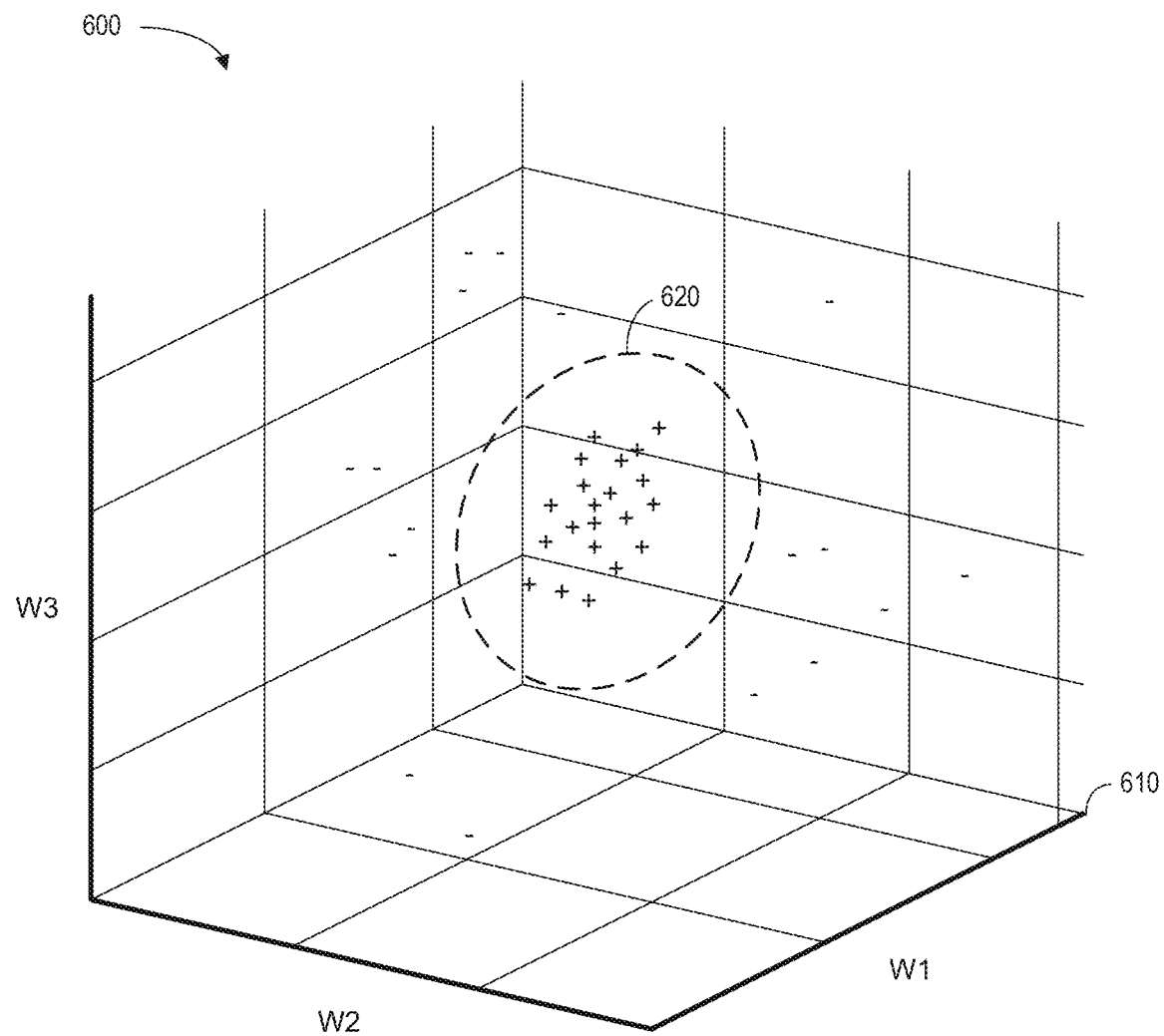

FIGS. 5 and 6 illustrate features, feature vectors, and decision boundaries in accordance with some embodiments. In particular, FIG. 5 illustrates 500 boundaries and feature vectors for a monitoring node parameter in accordance with some embodiments. A graph 510 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 510 illustrated in FIG. 5 represents compressor discharge temperature for a gas turbine but other values might be monitored instead (e.g., compressor pressure ratio, compressor inlet temperature, fuel flow, generator power, gas turbine exhaust temperature, etc.). The graph 510 includes an average boundary 512 (solid line), a minimum boundary 514 (dotted line), a maximum boundary 516 (dashed line), and an indication associated with current feature location for the monitoring node parameter (illustrated with an "X" on the graph 510). As illustrated in FIG. 5, the current monitoring node location is between the minimum and maximum boundaries (that is, the "X" is between the dotted and dashed lines). As a result, the system may determine that the operation of the industrial asset is normal (and no attack or fault is being detected for that monitoring node). FIG. 6 illustrates 600 three dimensions of threat node outputs in accordance with some embodiments. In particular, a graph 610 plots monitoring node outputs during normal operation ("+") and when under attack or experiencing a fault ("−") in three dimensions, such as dimensions associated with PCA: w1, w2, and w3. Moreover, the graph 610 includes a dashed line indication of a normal operating space decision boundary 620.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or other machine learning based supervised learning techniques) may be used to generate decision boundaries. Since boundaries may be driven by measured data, defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 7:
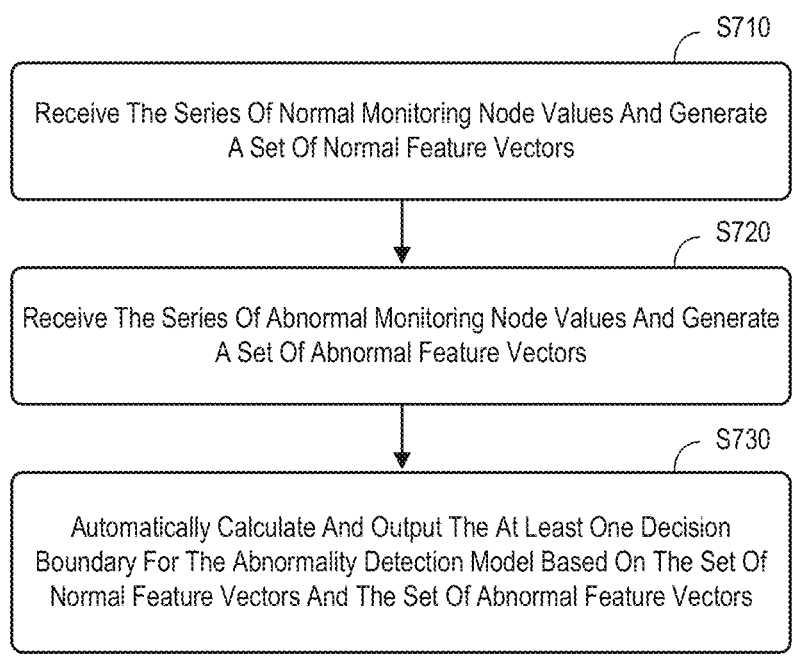
FIG. 7 is an abnormality detection model creation method according to some embodiments.

FIG. 7 illustrates a model creation method that might be performed by some or all of the elements of the system 100, 300 described with respect to FIGS. 1 and 3. At S710, the system may receive, for each of a plurality of monitoring nodes, a series of normal values over time that represent normal operation of the industrial asset and a set of normal feature vectors may be generated. At S720, the system may retrieve, for each of the plurality of monitoring nodes, a series of abnormal values over time that represent abnormal operation of the industrial asset and a set of abnormal feature vectors may be generated. The series of normal values might be obtained, for example, by DoE on an industrial control system associated with a power turbine, a jet engine, a locomotive, an autonomous vehicle, etc. At S730, a decision boundary may be automatically calculated and output for an abnormality detection model based on the sets of normal and abnormal feature vectors. According to some embodiments, the decision boundary might be associated with a line, a hyperplane, a non-linear boundary separating normal space from abnormal space, and/or a plurality of decision boundaries. In addition, note that the abnormality detection model might be associated with the decision boundary, feature mapping functions, and/or feature parameters.

Thus, a system may classify the status of an industrial control system having a plurality of monitoring nodes (including sensor, actuator, and controller nodes) as being normal or abnormal. This may enable tailored, resilient, and fault-tolerant control remedies, including the deployment of virtual sensors, against cyber-attacks and faults.

According to some embodiments, time-series data may be received from a collection of monitoring nodes (e.g., sensor, actuator, and/or controller nodes). Features may then be extracted from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or ROC statistics. The local features for each monitoring node may be stacked to create the global feature vector. The global feature vector may also contain interactive feature involving two or more monitoring nodes, e.g. cross-correlation between two nodes. According to some embodiments, the features may be normalized and the dimension of the global feature vector can then be further reduced using any dimensionality reduction technique such as PCA. Note that the features may be calculated over a sliding window of the signal time series and the length of the window (and the duration of the slide) may be determined from domain knowledge and inspection of the data or using batch processing.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Note that PCA information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, the output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, the weight may be found using the following equation (assuming that the basis sets are orthogonal):

$$w_j = (S-S_0)^T \Psi_j$$

Note that weights may be an example of features used in a feature vector.

Thus, once the observed quantities from monitoring nodes are expressed in terms of feature vectors (e.g., with many features), the feature vectors may then be used as points in a multi-dimensional feature space. During real-time abnormality detection, decisions may be made by comparing where each point falls with respect to a decision boundary that separates the space between two regions (or spaces): abnormal ("attack" or "fault") space and normal operating space. If the point falls in the abnormal space, the industrial asset is undergoing an abnormal operation such as during a cyber-attack. If the point falls in the normal operating space, the industrial asset is not undergoing an abnormal operation such as during a cyber-attack or fault. In some embodiments, an appropriate decision zone with boundaries is constructed using data sets as described herein with high fidelity models. For example, support vector machines may be used with a kernel function to construct a decision boundary. According to some embodiments, deep learning techniques may be used to construct decision boundaries.

Figure 8:
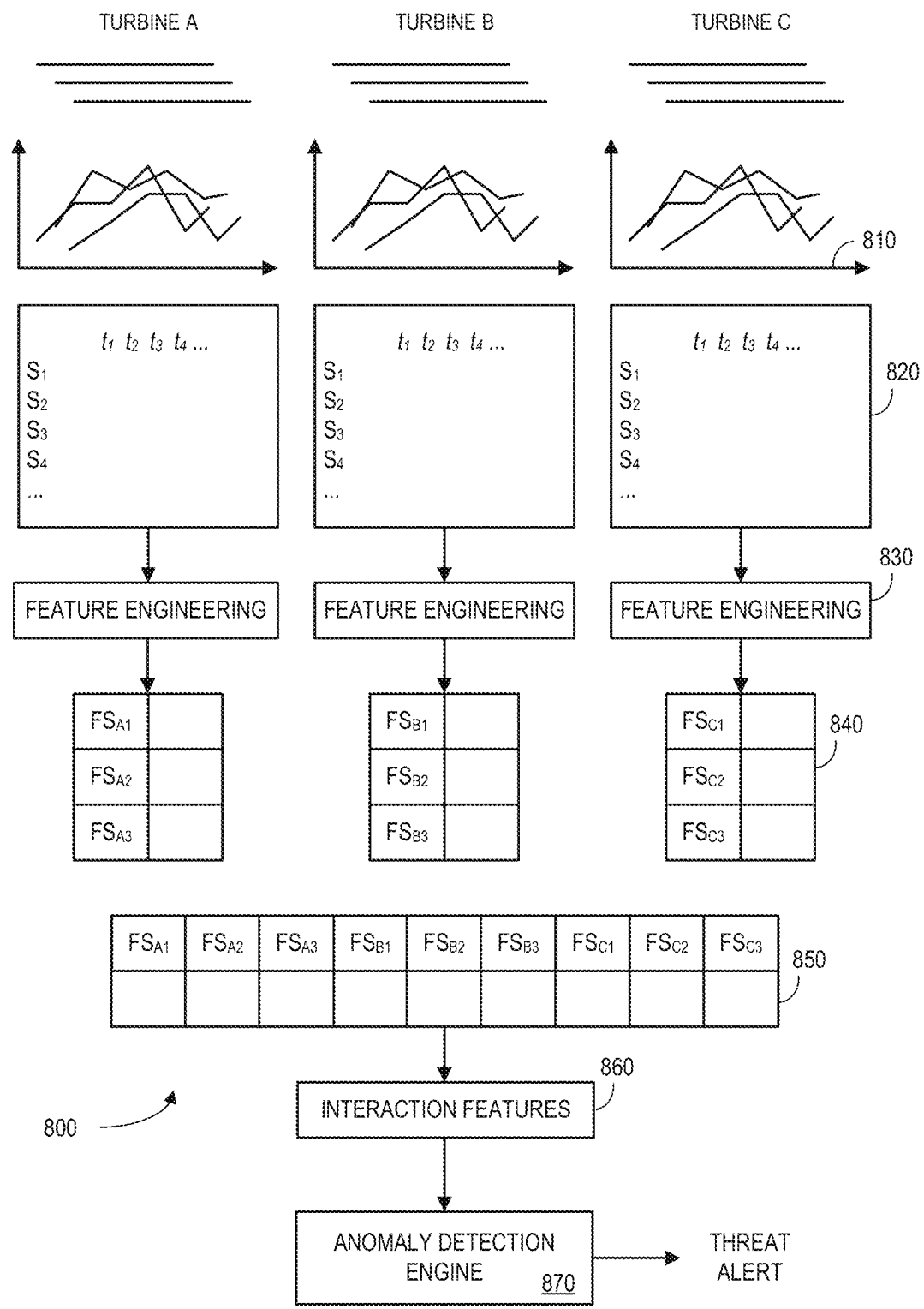
FIG. 8 is an example of a global threat protection system in accordance with some embodiments when multiple gas turbines are involved in a system.
Figure 9:
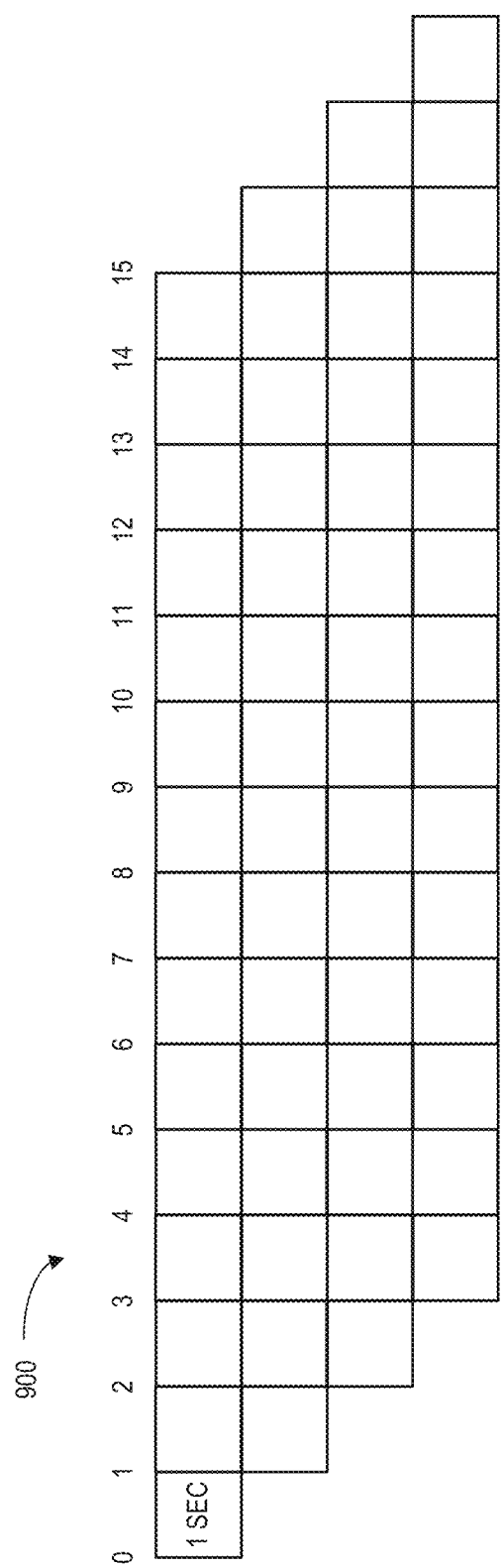
FIG. 9 illustrates a sliding window technique for real-time measurements in accordance with some embodiments.

Note that feature vectors might represent local or global information. For example, FIG. 8 is an example of a global threat protection system 800 in accordance with some embodiments when multiple gas turbines are involved in a system. In particular, the system 800 includes three turbines (A, B, and C) and batches of values 810 from threat nodes are collected for each generated over a period of time (e.g., 60 to 80 seconds). According to some embodiments, the batches of values 810 from threat nodes overlap in time. For example, FIG. 9 illustrates a sliding window 900 including a series of values per second. Referring again to FIG. 8, the values 810 from threat nodes may, for example, be stored in a matrix 820 arranged by time ($t_1$, $t_2$, etc.) and by type of threat node ($S_1$, $S_5$, etc.). Feature engineering components 830 may use information in each matrix 820 to create a feature vector 840 for each of the three turbines (e.g., the feature vector 840 for turbine C might include $FS_{C1}$, $FS_{C2}$, etc.). The three feature vectors 840 may then be combined into a single global feature vector 850 for the system 800. Interaction features 860 may be applied (e.g., associated with A*B*C, A+B+C, etc.) and an anomaly detection engine 870 may compare the result with a decision boundary and output a threat alert signal when appropriate.

To help achieve effective performance (in terms of accuracy, plasticity, and/or stability) for a developed detection model, the capability of continuously learning from a non-stationary environment with little or no abnormal or attack data available may be desirable. According to some embodiments, solutions to continuously update a detection model based on different system status and requirements may be provided. As used herein, the phrase "continuous learning" may refer to the idea of learning continuously and adaptively enabling autonomous incremental development of a detection model. Continuous learning may let a system smoothly update the model to take into account new data while still re-using and retaining useful knowledge to build on top of previously learned knowledge.

Figure 10:
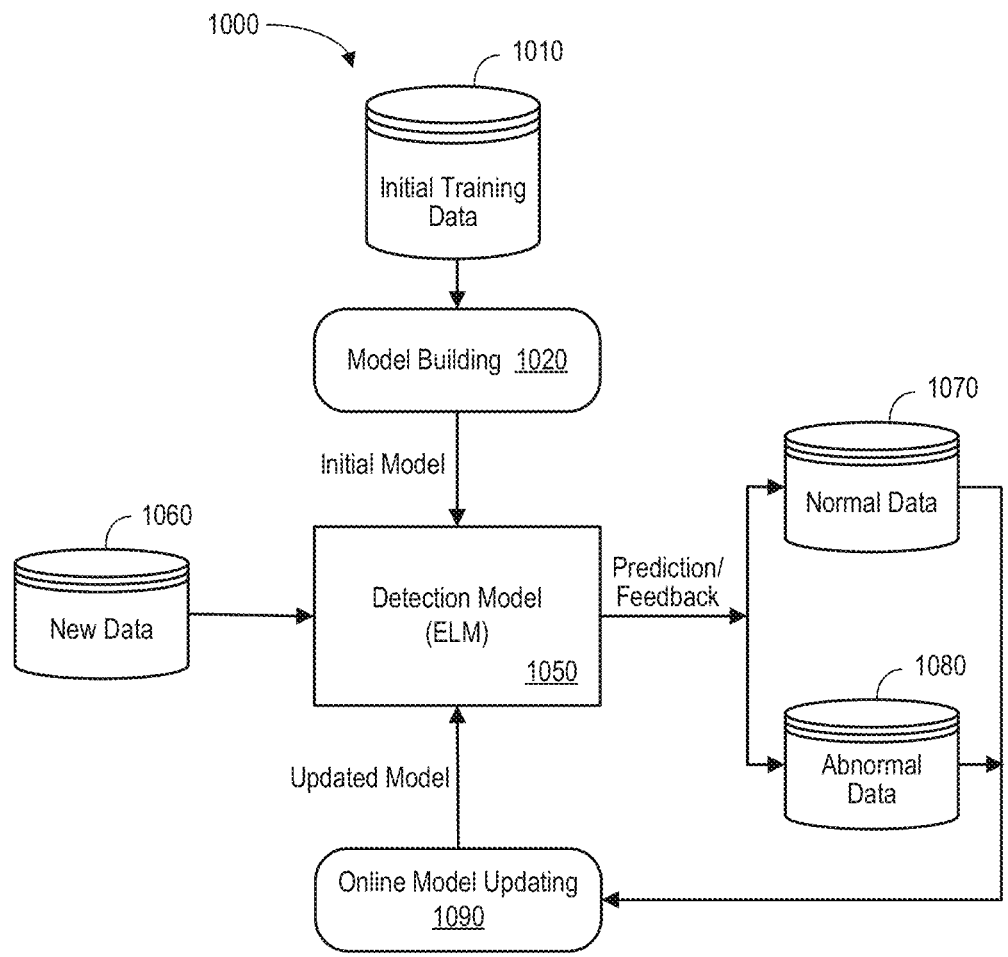
FIG. 10 is a high-level block diagram of a short-term solution for model updating according to some embodiments.

FIG. 10 is a high-level block diagram of a short-term solution 1000 for model updating according to some embodiments. Initial training data 1010 is used by model building 1020 to great an initial detection model 1030, such as a classifier having an online learning rule. One example of such a classifier is an Extreme Learning Machine ("ELM") that also receives new data 1060 during early operation. As used herein, the phrase "ELM" may refer to, for example, feedforward neural networks for classification, regression, clustering, sparse approximation, compression and/or feature learning with a single layer of hidden nodes. Note that the parameters of hidden nodes (e.g., not just the weights connecting inputs to hidden nodes) might not need to be tuned. Moreover, these hidden nodes might be randomly assigned (that is, a random projection) or be inherited from ancestors.

Prediction and feedback information is provided from the detection model to normal data 1070. In some embodiments, prediction and feedback information is also provided to abnormal data 1080 (note, however, that attacks or faults may be relatively rare events and, as a result, mostly only normal data 1070 may be available). Online model updating 1090 can then use the normal data 1070 and abnormal data 1080 to provide an updated detection model.

Note that for a short-term consideration (e.g., several hours or days after a model is created and deployed), an industrial system may not experience dramatic changes that are out of the boundary of initial design of experiments (in terms of component degradation or operation condition change) and a developed solution may mostly rely on the normal data 1070 to adapt the detection model 1050 to any changes. Any machine learning classification models that can be updated online can be used in this scenario. As one example, an ELM may be used as the detection model 1050, for which a recursive online updating rule is applied to update weights as appropriate.

Figure 11:
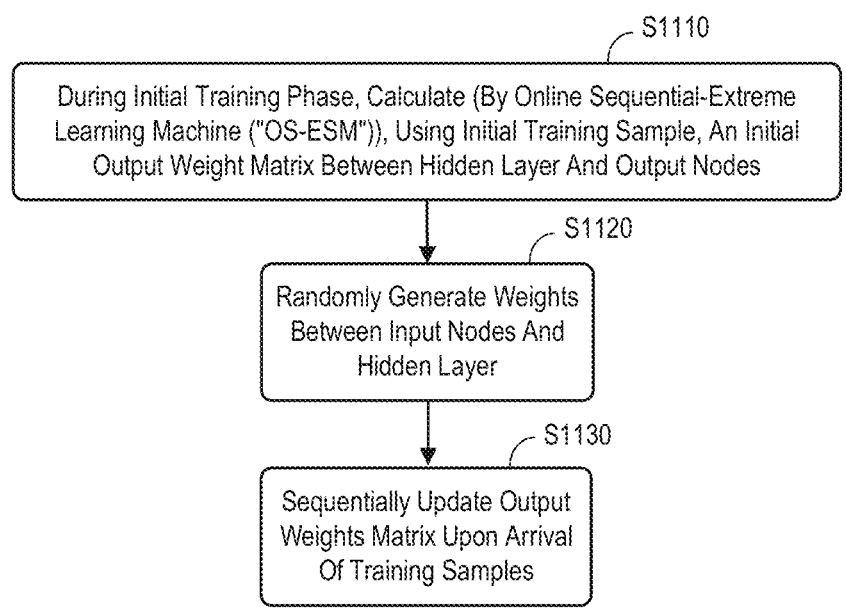
FIG. 11 is a short-term model updating method in accordance with some embodiments.

FIG. 11 is a short-term model updating method in accordance with some embodiments. Specifically, during an initial training phase at S1110 an Online Sequential ELM ("OS-ELM") or other incremental learning algorithm may use a set of $M_0$ initial training samples, $\{(x_i, y_i)\}_{i=1}^{M_0}$, $x_i \in \mathfrak{R}^d$, $y_i \in \mathfrak{R}^r$, to calculate the initial output weight matrix, $\beta^0$ between neurons in a hidden layer and r output nodes. The weights between input nodes and the hidden layer are randomly generated and fixed at S1120. Let:

$$h_i(x) = G(w_i, b_i, x), w_i \in \mathfrak{R}^d, b_i \in \mathfrak{R}, i=1, \ldots, L$$

where G(w, b, x) is a nonlinear piecewise continuous function satisfying ELM universal approximation capability theorems, $w_i$ is the weight, $b_i$ is the bias, and $L < M_0$ is the number of hidden neurons. The output of ELM can be calculated as:

$$f(x) = \sum_{i=1}^{L} \beta_i^0 h_i(x) = H(x)\beta^i$$

where $H(x) = [h_1(x), \ldots, h_L(x)]$ is a random feature map mapping the data from d-dimensional input space to the L-dimension random ELM feature space.

By using least square estimate method, $\beta^0$ can be calculated as:

$$\beta^0 = H^\dagger Y$$

where $H^\dagger$† is the Moore-Penrose generalized inverse of the matrix H, which can be calculated through the orthogonal projection approach:

$$H^\dagger = (H^T H + I/\gamma)^{-1} H^T$$

where $\gamma$ is the regularized factor.

Once the initial network is trained, OS-ELM will sequentially update the output weight matrix at S1130 upon the arrival of training samples. Given the $(M_0+k+1)^{th}$ training sample, OS-ELM calculates the partial hidden layer output matrix as:

$$H_{k+1} = [h_1(x_{M_0+k+1}), \ldots, h_L(x_{M_0+k+1})]$$

By setting:

$$t_{k+1} = y_{M_0+k+1}^T$$

the output weight matrix can be calculated as:

$$\beta^{k+1} = \beta^k + R_{k+1} H_{k+1}^T (t_{k+1} - H_{k+1} \beta^k)$$

where:

$$R_{k+1} = R_k - R_k H_{k+1}^T (I + H_{k+1} R_k H_{k+1}^T)^{-1} H_{k+1} R_k$$

for k=0, 1, 2, . . . , M-$M_0$+1.

Figure 12:
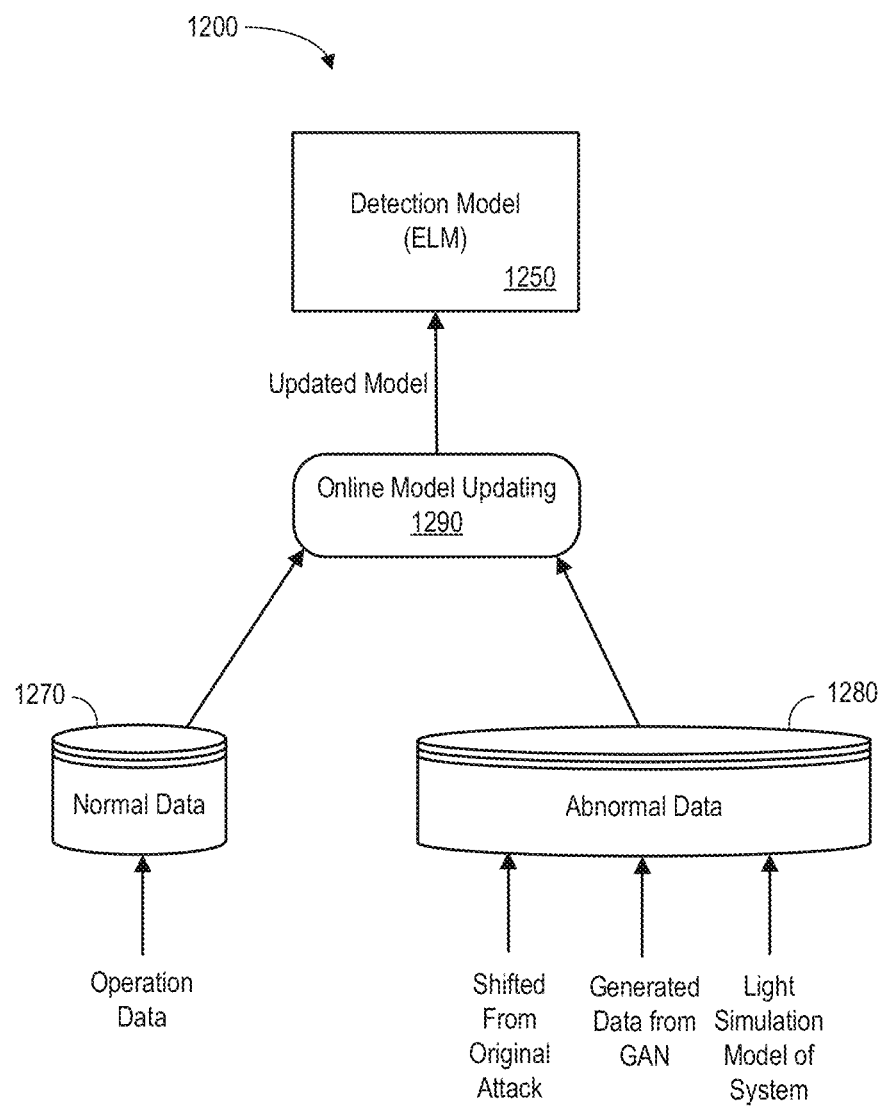
FIG. 12 is a high-level block diagram of a mid-term solution for model updating according to some embodiments.
Figure 13:
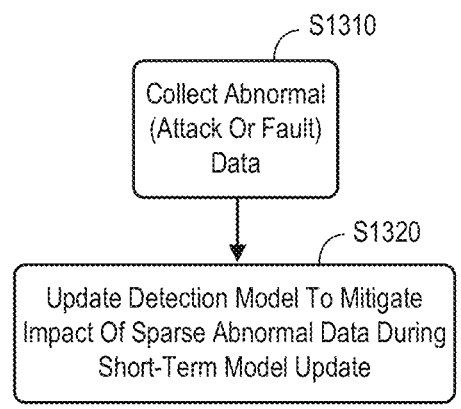
FIG. 13 is a mid-term model updating method in accordance with some embodiments.

For mid-term updating, which could happen every few months, a certain amount of abnormal data or attack data may be generated to update the model to mitigate the impact of sparse attack and fault data during short-term model updating. FIG. 12 is a high-level block diagram of a mid-term solution 1200 for model updating according to some embodiments. Normal data 1270 and abnormal data 1280 may be used by online model updating 1290 to provide an updated detection model 1250. The normal data 1270 might comprise operational data and the abnormal data 1280 might data generated in a Generative Adversarial Network ("GAN") based approach, data from a light simulation model of the system that will not incur a substantial simulation burden, data creating by shifting the original attack data based on the corresponding normal data distribution change, etc. FIG. 13 is a mid-term model updating method in accordance with some embodiments. At S1310, abnormal (attack or fault) data is collected. This might be associated with, for example, using a GAN to generate abnormal data, using a light simulation model of the system without incurrence of heavy simulation burden, shifting original attack data based on a corresponding normal data distribution change, etc. At S1320, the detection model is updated using collected abnormal data and a portion of initial training samples to mitigate an impact of sparse abnormal data during short-term model updating.

In addition to continuous learning, some embodiments described herein may utilize "transfer learning." As used herein, the phrase "transfer learning" may refer to, for example, machine learning that focuses on storing knowledge gained while solving a problem in one circumstance and applying it to a different but related problem in another circumstance. Note that effectively adapting cyber-physical system attack detection systems faces many challenges, such as the inherent nonstationary property of complex industrial systems and the sparsity of abnormal (fault or attack) data. To address these issues, embodiments may continuously update cyber-attack and fault detection models with transfer learning technologies. Specifically, systems and methods may use a DANN to find a common feature representation between the initial training data, which is generated from a high-fidelity simulation model, and new data from operation that drift from the distribution of training data. The approach may not require the drifted data to be labeled and might not require any new and drifted attack or fault data (which is sparse and expensive to generate in real time). Although a DANN is described in accordance with some embodiments, note that other embodiments might instead utilize, for example, any transfer learning algorithm based on constructing common latent space for source and target data, a Transfer Component Analysis ("TCA"), etc.

Figure 14:
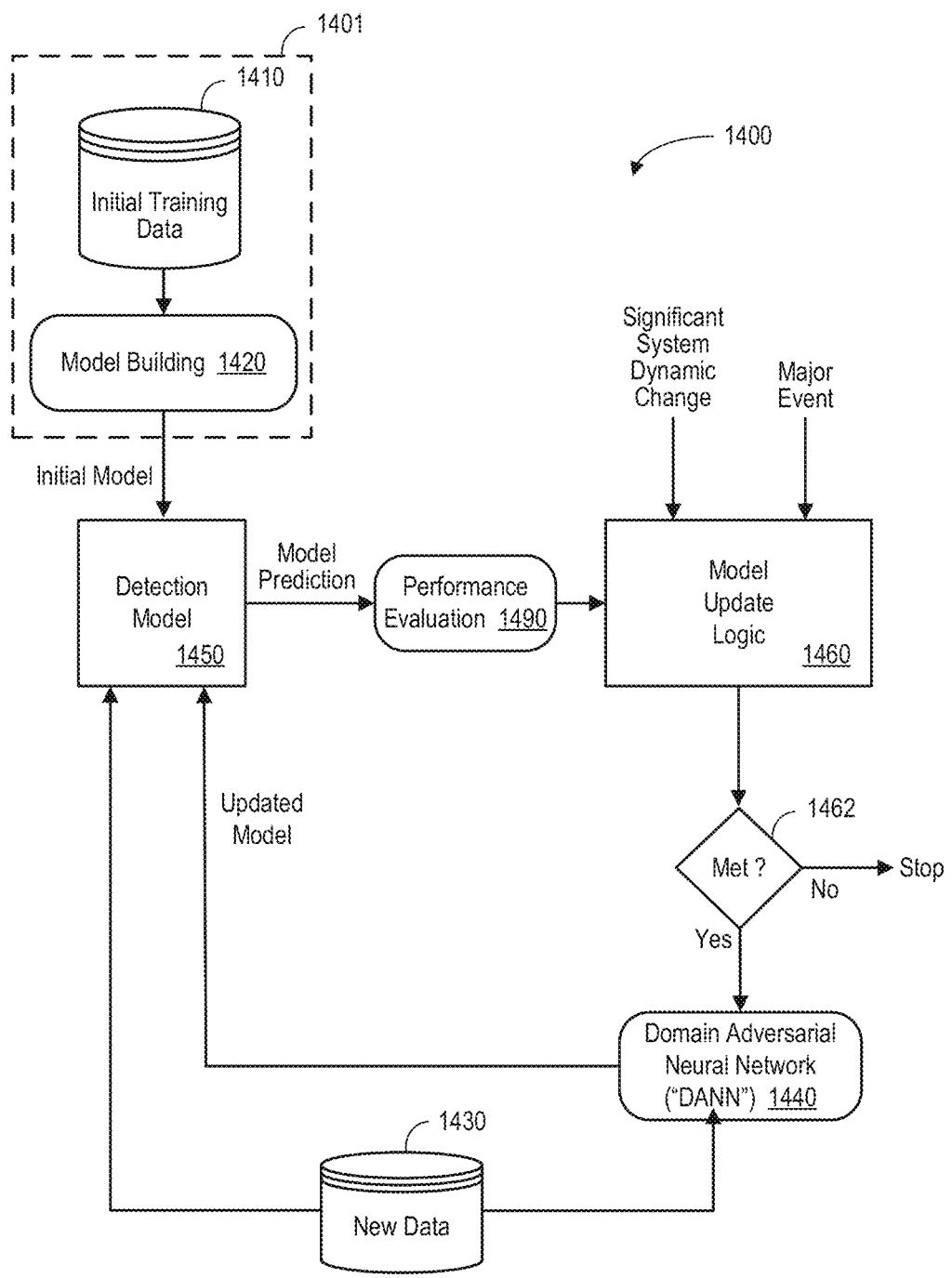
FIG. 14 is a diagram of a continuous learning framework with transfer learning according to some embodiments.

For example, FIG. 14 is a diagram of a continuous learning framework 1400 with transfer learning according to some embodiments. In an initialization phase, model building 1420 may use initial training 1410 data to create an initial detection model 1450. A model prediction may be provided from the detection model 1450 to performance evaluation 1490 when sends evaluation results to model update logic 1460. If update requirements are not met at 1462 the process stops. If update requirements are met at 1462, information is provided to a DANN 1440 that uses new data 1430 to create an updated detection model 1450.

Figure 15:
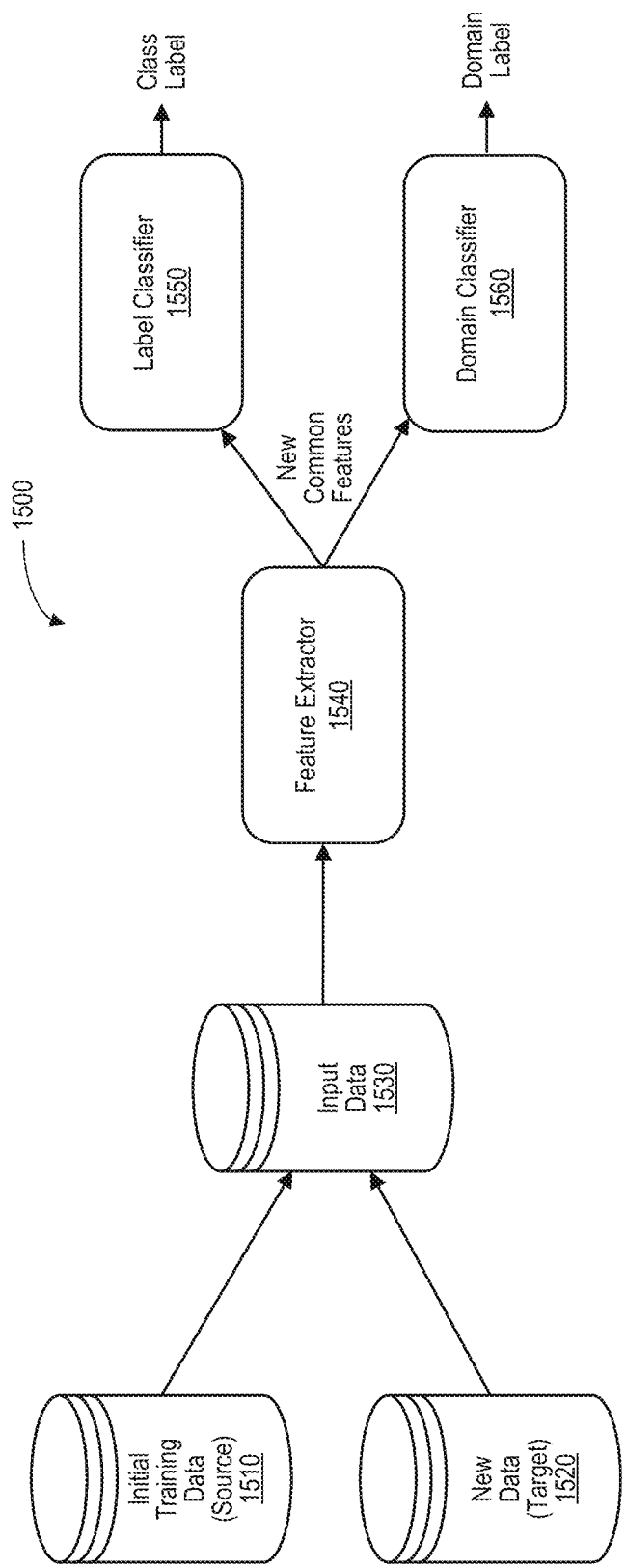
FIG. 15 is a diagram of a Domain-Adversarial Neural Network ("DANN") in accordance with some embodiments.

FIG. 15 is a diagram of a DANN 1500 in accordance with some embodiments. The DANN 1500 includes a feature extractor 1540, which could be a deep network, to learn a common feature representation for both source 1510 and target 1520 data ("input" data 1530), while it trains a label classifier 1550 and a domain classifier simultaneously 1560. The binary label classifier 1550 predicts the label (normal or attack) of a given input sample and forms a standard feedforward architecture with the feature extractor 1540. The domain classifier 1560, which is also binary, tells whether the input sample comes from source 1510 or target 1520 domain and is connected to the feature extractor 1540 with a gradient reversal layer. The training process of the DANN 1500 aims to minimize the cost of label classifier 1550 for separating normal and abnormal samples, while maximizing the cost of the domain classifier 1560 so that the data from source 1510 and target 1520 data are not discriminable on the learned latent space. After the DANN 1500 training is done, the label classifier 1550 of the DANN 1500 may be used as the abnormality detection model for the incoming data (until a new update is required).

Figure 16:
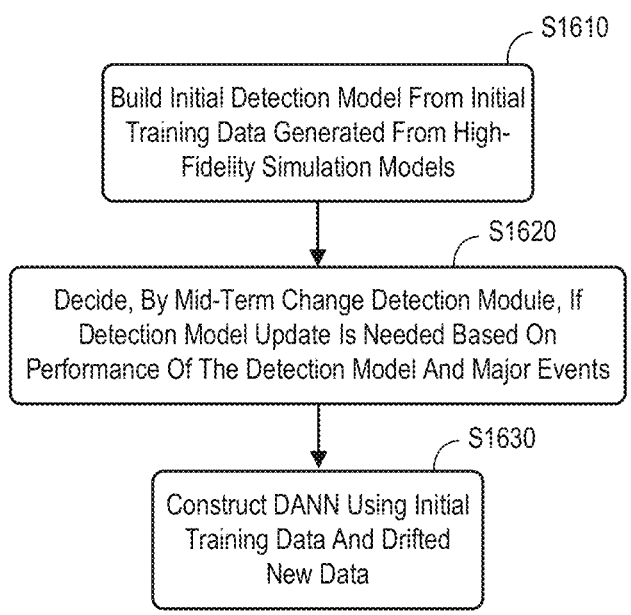
FIG. 16 is a mid-term method with transfer learning according to some embodiments.

FIG. 16 is a mid-term method with transfer learning according to some embodiments. At S1610, an initial detection model is built from the initial training data that are generated from high-fidelity simulation models. At S1620, a mid-term change detection module will take information from different sources such as the performance of the detection model (mostly in terms of false alarm rate) and major events (including system reconfiguration or major maintenance actions) and decide if a model update is needed. If the detection model needs to be updated, a DANN will be constructed at S1630 using the initial training data (considered as data from source domain in the terminology of transfer learning) and the drifted new data (known as data from target domain). Since the abnormal data is very limited in real operation, the target data might usually only include normal operation data. According to some embodiments, the target data may be maintained in a buffer based on a first-in-first-out criterion. The size of the buffer may be selected, for example, based on a size of the initial training set and the sample frequency for the operation data.

Figure 17A:
FIGS. 17A and 17B illustrate Receiver Operating Characteristics ("ROC") curves of DANN performance on data with degradation.
Figure 17B:
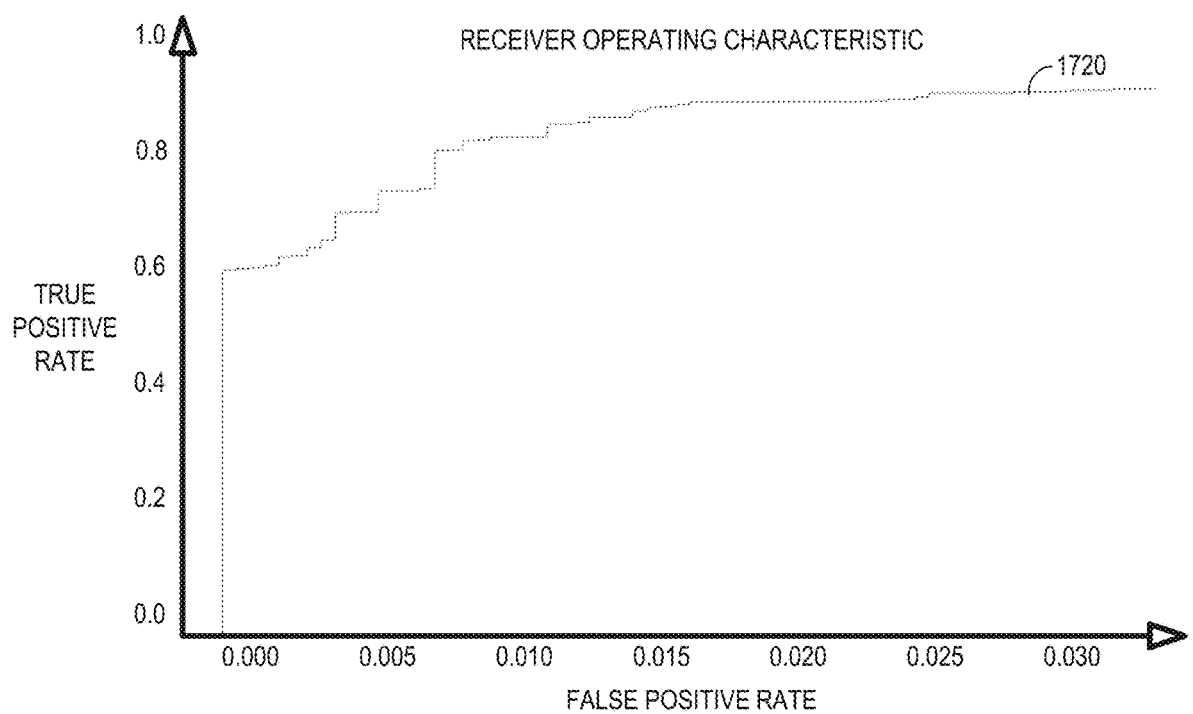

A data set may be constructed to verify the effectiveness of the DANN-based approach for model adaptation. The training data or source data might include simulated normal operation data and multiple different types of abnormal data without any efficiency loss from a gas turbine compressor. An initial neural network model may be trained with the source data and achieve 99.3% True Positive Rate ("TPR") and 0.3% False Positive Rate ("FPR"). When this model is applied to the test data set (which consists of data with 2.5% efficiency loss) the performance of this well-trained neural network model drops significantly with only 86.4% TPR but 29.7% FPR. When a DANN-based transfer learning strategy is applied, the detection model may still achieve 84.1% TPR and 1% FPR on the degradation data (with no labels from target domain required). With 2.89% FPR, the TPR may increase to 90.2%. For example, FIG. 17A illustrates a Receiver Operating Characteristics ("ROC") curve 1710 of DANN performance on data with degradation (with the area under the curve being 0.988) and FIG. 17B shows the portion of the curve 1720 in the region of FPR from 0 to 3%. Note that transfer learning embodiments may be associated with techniques for continuously learning in a dynamic environment with limited abnormal data. The common approach for concept drift learning is to use ensemble-based techniques, which dynamically add or remove models in an ensemble and adjust model weights based on their performance. Such approaches usually require a large amount of abnormal (fault or attack) data to maintain the effective performance of the models.

Figure 18:
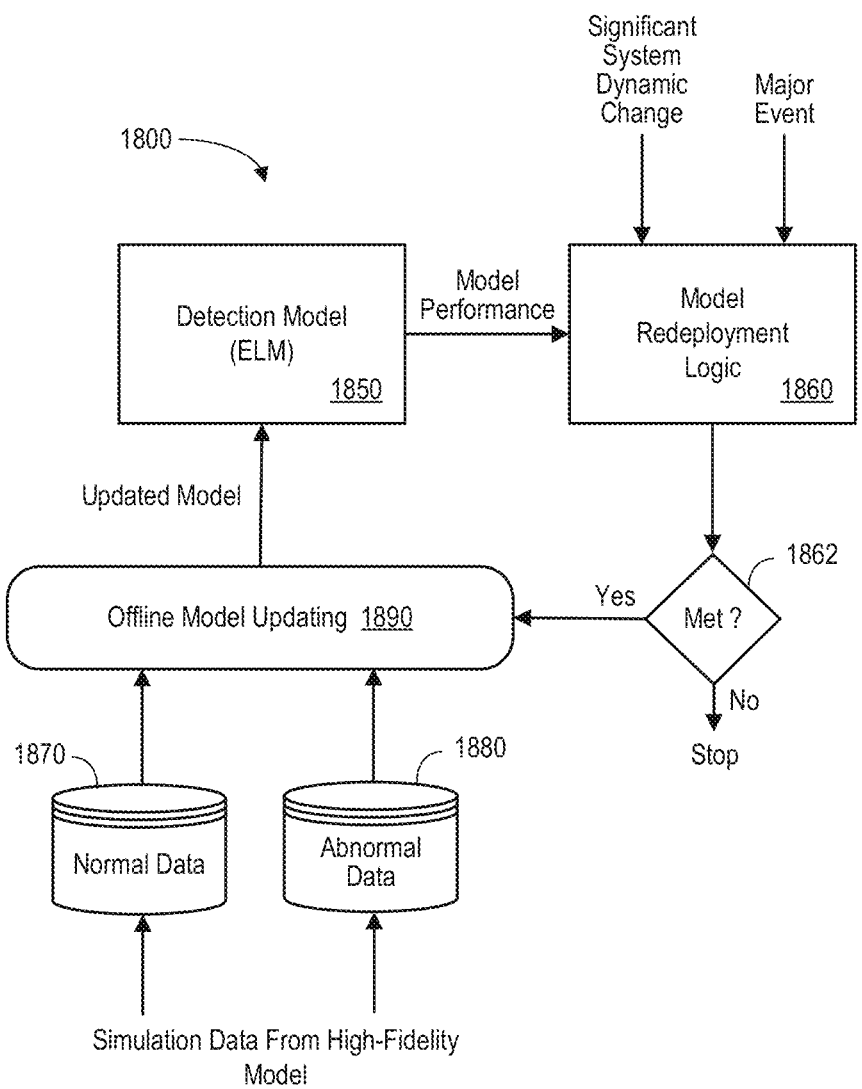
FIG. 18 is a high-level block diagram of a long-term solution for model updating in accordance with some embodiments.

Eventually, with a significant loss of system component efficiency or major events happening (such as a system reconfiguration or a major maintenance operation), the detection model may need to be redeployed with enough normal and attack or fault data (e.g., abnormal data) that correctly represents the system behavior. For example, FIG. 18 is a high-level block diagram of a long-term solution 1800 for model updating in accordance with some embodiments. Model performance information about a detection model 1850 is provided to model redeployment logic 1860 that may also receive information about significant system dynamic changes and major events. If redeployment criteria are not met at 1862, the process ends. If redeployment criteria are met at 1862, offline model updating 1890 uses normal data 1870 and abnormal data 1880 (e.g., generated simulation data from a high-fidelity model) to generate an updated detection model 1850. The normal data 1870 and abnormal data 1880 might be generated by the high-fidelity model as the initial training data is collected. Such update may happen, for example, every few years or be event driven.

Figure 19:
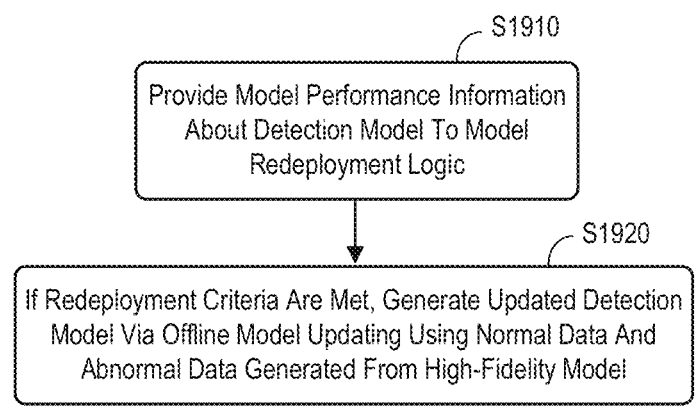
FIG. 19 is a long-term model updating method according to some embodiments.
Figure 20:
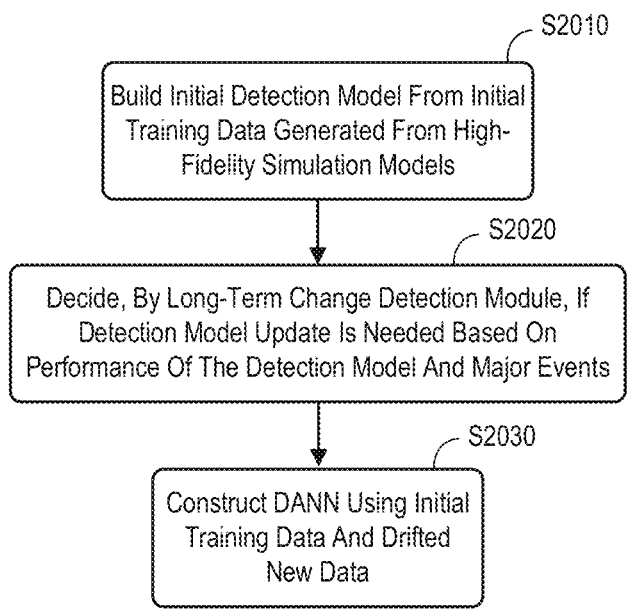
FIG. 20 is a long-term method with transfer learning in accordance with some embodiments.

FIG. 19 is a long-term model updating method according to some embodiments. At S1910, the system may provide model performance information about a detection model to model redeployment logic. If redeployment criteria are met, at S1920 the system may generate an updated detection model via offline model updating using normal data and abnormal data generated from a high-fidelity model. FIG. 20 is a long-term method with transfer learning in accordance with some embodiments. At S2010, an initial detection model is built from the initial training data that are generated from high-fidelity simulation models. At S2020, a long-term change detection module will take information from different sources such as the performance of the detection model and major events (including system reconfiguration or major maintenance actions) and decide if a model update is needed. If the detection model needs to be updated, a DANN will be constructed at S2030 using offline model updating.

The performance of a detection algorithm with and without continuous learning capability may be compared. For example, asset efficiency may decrease from 100% to 97.5%, 95%, and 90%. Without continuous learning, the false alarm may rise significantly as the degradation level increases, which means that many of normal operations will be labeled as attacks or faults by the algorithm. In comparison, if the model is retrained and redeployed with the most recent normal data, the performance may still be maintained with desired levels. When only normal data is used for online model updating (i.e., short-term strategy), the false alarm rate may be controlled within an expected limit, but with a certain loss of detection rate, particularly when the efficiency loss is large (e.g., 10%). It may be more appropriate for the long-term model updating strategy to be applied at that level of degradation.

Thus, embodiments may provide a framework of continuous learning for a cyber-attack or fault detection model and may use multiple ways of model updating (e.g., short-term, mid-term, and long-term strategies). For short-term updating, any classifier with online learning capability might be used. In a transfer learning-based approach, however, an online updating rule is not available. Note that transfer learning may fit into a mid-term and/or long-term updating framework. Model updating may be triggered based on time-based criteria, performance-based, criteria, etc. and DANN then learns the underlying common latent space between the initial and drifted data sets while constructing the decision boundaries for normal and abnormal. In this case, an initial model may also be built by using DANN. The system may, for example, provide part of training data as the target set to build the initial model. Note that transfer learning can be extended to fleets of assets, as for the target data set, it does not matter if it comes from the same asset (but drifted) or from different assets. As a result, the system might not need to build a high-fidelity model for every asset (which is not trivial and time consuming). For example, target data may be associated with information from another industrial asset, such as another asset in the same fleet of assets or another asset in a similar fleet of assets. A detection model with continuous learning capability may then be built without needing to construct a high-fidelity simulation model.

Embodiments described herein provide techniques for continuously learning in a dynamic environment with limited abnormal data. Another approach that could be used is to build a semi-supervised model that uses normal data only, and continuously update the model based on a concept drift detector algorithm (which could use information such as data distribution and model performance to decide whether a model update is needed). However, when sufficient and well-distributed data (both normal and abnormal) are available, supervised methods are superior to semi-supervised methods. An ensemble-based approach could also be used by dynamically adding or removing models and changing model weights based on their performance. The issue with this approach, however, is that fast feedback about the algorithm is required (but the system may experience significant delays in an application for cyber-physical attack or fault detection).

Figure 21:
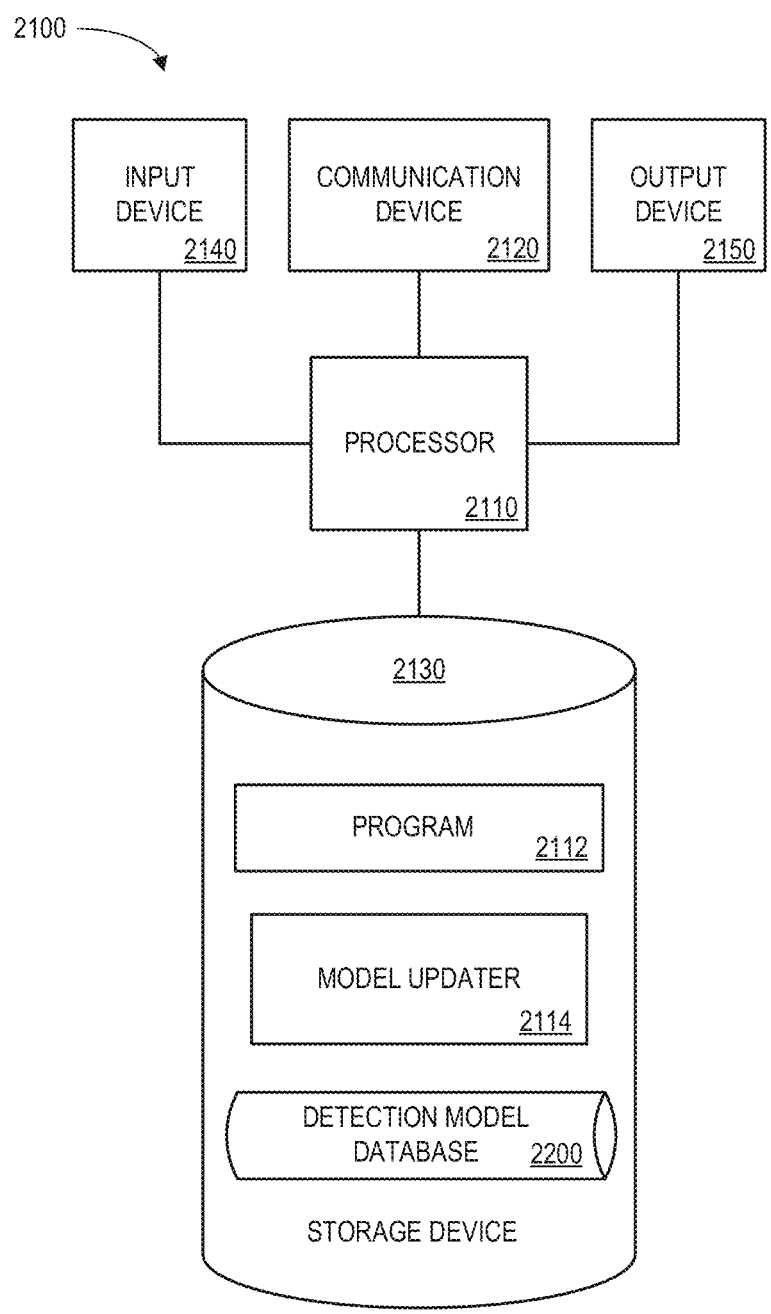
FIG. 21 is a block diagram of an industrial asset protection platform according to some embodiments of the present invention.

The embodiments described herein may be implemented using any number of different hardware configurations. For example, FIG. 21 is a block diagram of an industrial asset protection platform 2100 that may be, for example, associated with the system 100 of FIG. 1. The industrial asset protection platform 2100 comprises a processor 2110, such as one or more commercially available Central Processing Units ("CPUs") in the form of one-chip microprocessors, coupled to a communication device 2120 configured to communicate via a communication network (not shown in FIG. 21). The communication device 2120 may be used to communicate, for example, with one or more remote monitoring nodes, user platforms, digital twins, etc. The industrial asset protection platform 2100 further includes an input device 2140 (e.g., a computer mouse and/or keyboard to input virtual sensor parameters, localization data, modeling information, etc.) and/or an output device 2150 (e.g., a computer monitor to render a display, provide alerts, transmit recommendations, and/or create reports). According to some embodiments, a mobile device, monitoring physical system, and/or PC may be used to exchange information with the industrial asset protection platform 2100.

The processor 2110 also communicates with a storage device 2130. The storage device 2130 may comprise any appropriate information storage device, including combinations of magnetic storage devices (e.g., a hard disk drive), optical storage devices, mobile telephones, and/or semiconductor memory devices. The storage device 2130 stores a program 2112 and/or a model updater 2114 for controlling the processor 2110. The processor 2110 performs instructions of the programs 2112, 2114, and thereby operates in accordance with any of the embodiments described herein. For example, the processor 2110 may detect when a monitoring node is currently being attacked or experiencing a fault based on a current feature vector, calculated in accordance with current monitoring node values, and a detection model that includes a decision boundary. The processor 2110 may also determine an update time-frame (e.g., short-term, mid-term, long-term, etc.) associated with the system based on trigger occurrence detection (e.g., associated with a time-based trigger, a performance-based trigger, an event-based trigger, etc.). The processor 2110 may then update the detection model in accordance with the determined update time-frame (and, in some embodiments, continuous learning).

The programs 2112, 2114 may be stored in a compressed, uncompiled and/or encrypted format. The programs 2112, 2114 may furthermore include other program elements, such as an operating system, clipboard application, a database management system, and/or device drivers used by the processor 2110 to interface with peripheral devices.

As used herein, information may be "received" by or "transmitted" to, for example: (i) the industrial asset protection platform 2100 from another device; or (ii) a software application or module within the industrial asset protection platform 2100 from another software application, module, or any other source.

In some embodiments (such as the one shown in FIG. 21), the storage device 2130 further stores a detection model database 2200. An example of a database that may be used in connection with the industrial asset protection platform 2100 will now be described in detail with respect to FIG. 22. Note that the database described herein is only one example, and additional and/or different information may be stored therein. Moreover, various databases might be split or combined in accordance with any of the embodiments described herein.

Referring to FIG. 22, a table is shown that represents the detection model database 2200 that may be stored at the industrial asset protection platform 2100 according to some embodiments. The table may include, for example, entries identifying detection models. The table may also define fields 2202, 2204, 2206, 2208, 2210, 2212, 2214 for each of the entries. The fields 2202, 2204, 2206, 2208, 2210, 2212, 2214 may, according to some embodiments, specify: an industrial asset identifier 2202, an industrial asset description 2204, a detection model identifier 2206, a trigger occurrence 2208, a date (time) 2210, a time-frame 2212, and a status 2214. The detection model database 2200 may be created and updated, for example, when a new physical system is monitored or modeled, upon a trigger occurrence, a model is updated, etc.

The industrial asset identifier 2202 and industrial asset description 2204 may define a particular machine or system that will be protected. The detection model identifier 2206 may identify, for example, an ELM, with a decision boundary, deployed to protect that asset. The trigger occurrence 2208 might indicate, for example, if an event-based, time-based, performance-based, etc. trigger has occurred. The date and time 2210 may indicate when the trigger occurrence 2208 was detected. The time-frame 2212 might indicate which model update strategy is appropriate (e.g., short-term, mid-term, or long-term). The status 2214 might indicate that no update is currently needed, an update is in process, an updated has been completed, etc.

Figure 23:
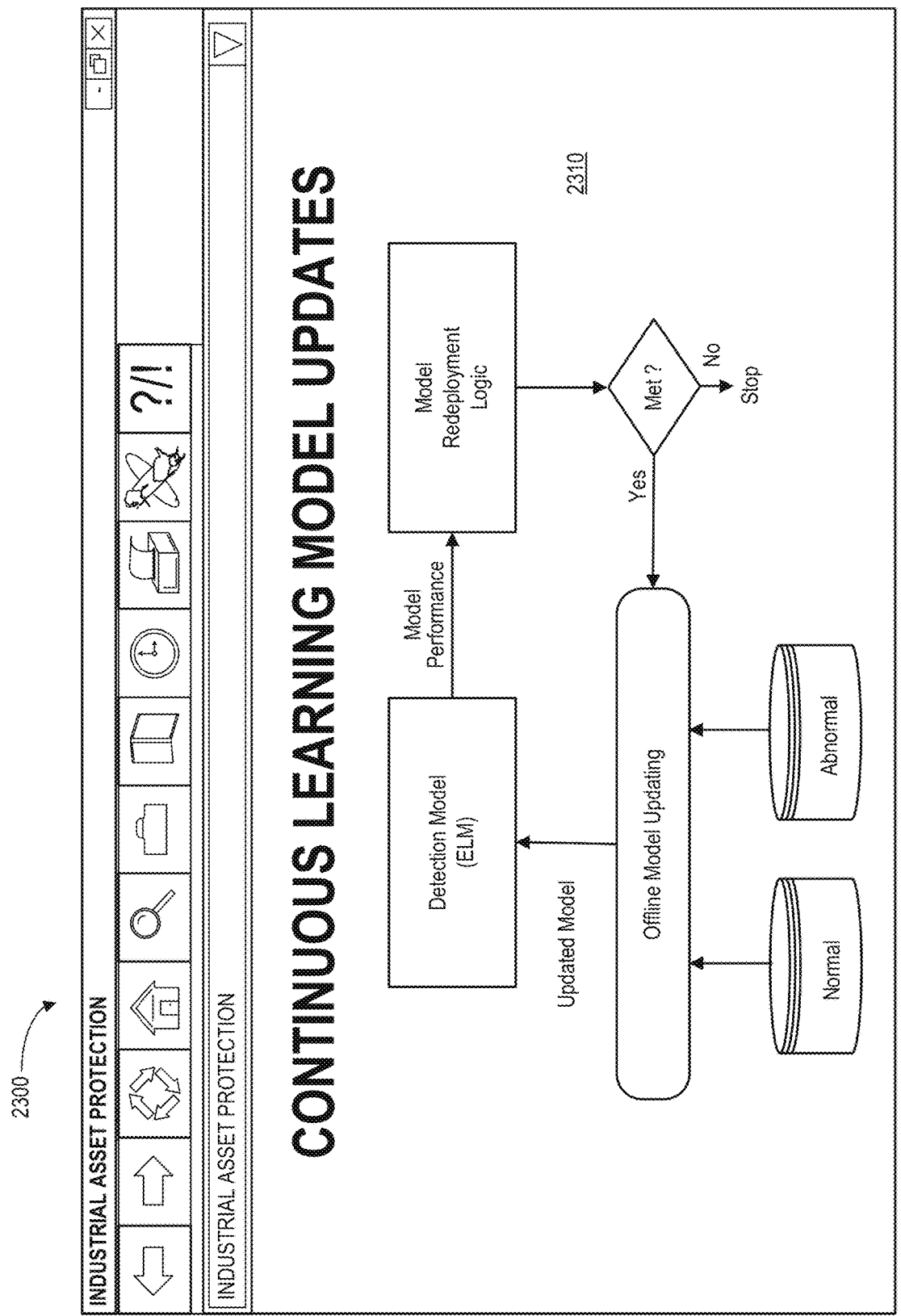
FIG. 23 is a continuous learning model updates display according to some embodiments.

FIG. 23 is an example of a continuous learning model updates display 2300 that might be used, for example, to provide system information 2310 to an operator and/or to provide an interactive interface allowing an operator to adjust model update rules and logic as appropriate. Selection of an element on the display 2300 (e.g., via a touchscreen or computer pointer) might, for example, result in the presentation of more information about that element (e.g., via a popup window), allow an operator to adjust parameters associated with the element, etc.

Some embodiments described herein may provide systems and/or methods for updating a model that detects anomalies (e.g., cyber-attack or faults) using continuous learning in complex and dynamic environments with sparse abnormal data samples. The disclosed technologies are general and can be applied to a wide range of industrial applications within nonstationary environments. Moreover, some embodiments further improve detection model updates using transfer learning.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, autonomous vehicles, military devices, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
  a plurality of monitoring nodes, each monitoring node generating a series of current monitoring node values over time that represent a current operation of the industrial asset;
  an abnormality detection computer to detect when a monitoring node is currently being attacked or experiencing a fault based on a current feature vector, calculated in accordance with current monitoring node values, and a detection model that includes a decision boundary; and a model updater, including:
- a computer processor, and
- a computer memory storing instructions that, when executed by the computer processor, cause the model updater to:
  - determine a short-term model update time-frame associated with the system based on trigger occurrence detection, and
  - update the detection model in accordance with the determined short-term model update time-frame by, during an initial training phase, calculating by an online or incremental learning algorithm, using an initial training sample and sequentially updating model parameters upon arrival of training samples.

2. The system of claim 1, wherein the model updater comprises a continuous learning model updater and the detection model is updated in accordance with continuous learning in addition to the determined short-term model update time-frame.

3. The system of claim 1, wherein at least one trigger occurrence detection is associated with at least one of: (i) a time-based trigger, (ii) a performance-based trigger, and (iii) an event-based trigger.

4. A system to protect an industrial asset, comprising:
- a plurality of monitoring nodes, each monitoring node generating a series of current monitoring node values over time that represent a current operation of the industrial asset;
- an abnormality detection computer to detect when a monitoring node is currently being attacked or experiencing a fault based on a current feature vector, calculated in accordance with current monitoring node values, and a detection model that includes a decision boundary; and
- a model updater, including:
  - a computer processor, and
  - a computer memory storing instructions that, when executed by the computer processor, cause the model updater to:
    - determine a mid-term model update time-frame associated with the system based on trigger occurrence detection, and
    - update the detection model in accordance with the determined mid-term model update time-frame by collecting abnormal data and updating the detection model to mitigate an impact of sparse abnormal data during short term-model updating.

5. The system of claim 4, further comprising transfer learning that includes:
- building an initial detection model from initial training data generated from high-fidelity simulation models;
- deciding, by a mid-term change detection module, if a detection model update is needed based on a performance of the detection model and major events; and
- constructing a neural network using the initial training data and drifted new data by finding a common feature representation.

6. The system of claim 5, wherein target data is associated with information from another industrial asset, and a detection model with continuous learning capability is built without constructing a high-fidelity simulation model.

7. The system of claim 6, wherein the constructed neural network comprises at least one of: (i) a transfer learning algorithm based on constructing common latent space for source and target data, (ii) a Transfer Component Analysis ("TCA"), and (iii) a Domain-Adversarial Neural Network ("DANN").

8. The system of claim 4, wherein the model updater comprises a continuous learning model updater and the detection model is updated in accordance with continuous learning in addition to the determined mid-term model update time-frame.

9. The system of claim 4, wherein at least one trigger occurrence detection is associated with at least one of: (i) a time-based trigger, (ii) a performance-based trigger, and (iii) an event-based trigger.

10. The system of claim 4, wherein collecting abnormal data is associated with at least one of: (i) using a Generative Adversarial Network ("GAN") to generate abnormal data, (ii) using a light simulation model of the system without incurrence of heavy simulation burden, and (iii) shifting original attack data based on a corresponding normal data distribution change.

11. A system to protect an industrial asset, comprising:
- a plurality of monitoring nodes, each monitoring node generating a series of current monitoring node values over time that represent a current operation of the industrial asset;
- an abnormality detection computer to detect when a monitoring node is currently being attacked or experiencing a fault based on a current feature vector, calculated in accordance with current monitoring node values, and a detection model that includes a decision boundary; and
- a model updater, including:
  - a computer processor, and
  - a computer memory storing instructions that, when executed by the computer processor, cause the model updater to:
    - determine a long-term model update time-frame associated with the system based on trigger occurrence detection, and
    - update the detection model in accordance with the determined long-term model update time-frame by providing model performance information about a detection model to model redeployment logic and, if redeployment criteria are met, generating an updated detection model via offline model updating using normal data and abnormal data generated from a high-fidelity model.

12. The system of claim 11, further comprising transfer learning that includes:
- building an initial detection model from initial training data generated from high-fidelity simulation models;
- deciding, by a long-term change detection module, if a detection model update is needed based on a performance of the detection model and major events; and
- constructing a neural network using the initial training data and drifted new data by finding a common feature representation.

13. The system of claim 12, wherein the constructed neural network comprises at least one of: (i) a transfer learning algorithm based on constructing common latent space for source and target data, (ii) a Transfer Component Analysis ("TCA"), and (iii) a Domain-Adversarial Neural Network ("DANN").

14. The system of claim 11, wherein the model updater comprises a continuous learning model updater and the detection model is updated in accordance with continuous learning in addition to the determined long-term model update time-frame.

15. The system of claim 11, wherein at least one trigger occurrence detection is associated with at least one of: (i) a time-based trigger, (ii) a performance-based trigger, and (iii) an event-based trigger.

16. The system of claim 11, wherein the redeployment criteria include at least one of: (i) a time-based trigger, (ii) a performance-based trigger, and (iii) an event-based trigger.

17. A system to protect an industrial asset, comprising:
a plurality of monitoring nodes, each monitoring node generating a series of current monitoring node values over time that represent a current operation of the industrial asset;
an abnormality detection computer to detect when a monitoring node is currently being attacked or experiencing a fault based on a current feature vector, calculated in accordance with current monitoring node values, and a detection model that includes a decision boundary; and
a model updater, including:
  a computer processor, and
  a computer memory storing instructions that, when executed by the computer processor, cause the model updater to:
    determine an update time-frame associated with the system based on trigger occurrence detection, and
    update the detection model in accordance with the determined update time-frame,
wherein at least some of the monitoring nodes comprise sensor nodes and the detection model is associated with a classifier having an online learning rule.

18. The system of claim 17, wherein the model updater comprises a continuous learning model updater and the detection model is updated in accordance with continuous learning in addition to the determined update time-frame.

19. The system of claim 17, wherein at least one trigger occurrence detection is associated with at least one of: (i) a time-based trigger, (ii) a performance-based trigger, and (iii) an event-based trigger.

20. The system of claim 17, wherein the classifier is associated with an Extreme Learning Machine ("ELM").

\* \* \* \* \*